United States Patent
Maeda et al.

(10) Patent No.: US 7,280,341 B2
(45) Date of Patent: Oct. 9, 2007

(54) ELECTROSTATIC CHUCK

(75) Inventors: Takao Maeda, Takefu (JP); Satoshi Shima, deceased, late of Takefu (JP); by Yuko Shima, legal representative, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/052,229

(22) Filed: Feb. 8, 2005

(65) Prior Publication Data

US 2005/0168908 A1    Aug. 4, 2005

Related U.S. Application Data

(63) Continuation-in-part of application No. 10/737,785, filed on Dec. 18, 2003, now abandoned.

(30) Foreign Application Priority Data

Dec. 27, 2002    (JP)    ............... 2002-379389

(51) Int. Cl.
    *H02N 13/00*    (2006.01)
(52) U.S. Cl. ................................... 361/234
(58) Field of Classification Search ............... 361/234
    See application file for complete search history.

(56) References Cited

U.S. PATENT DOCUMENTS 6,051,303 A * 4/2000 Katsuda et al. ............. 428/138
6,139,983 A * 10/2000 Ohashi et al. ............... 428/698
6,284,323 B1   9/2001 Maloney
6,448,538 B1 * 9/2002 Miyata ..................... 219/444.1
6,576,354 B2   6/2003 Tsukatani et al.
6,632,549 B1 * 10/2003 Ohashi et al. ............... 428/698
6,733,843 B2   5/2004 Tsukatani et al.
6,749,930 B2 * 6/2004 Ohashi ...................... 428/312.6
7,122,490 B2 * 10/2006 Kobayashi et al. ......... 501/98.4
2002/0037430 A1   3/2002 Takeishi et al.
2002/0160189 A1  10/2002 Wataya et al.
2002/0177014 A1 * 11/2002 Kaneyoshi et al. ......... 428/702
2002/0192429 A1  12/2002 Takai et al.
2004/0013911 A1   1/2004 Maeda

FOREIGN PATENT DOCUMENTS

| EP | 1 156 130 A1 | 11/2001 |
|----|--------------|---------|
| JP | 362298119 A  | 12/1987 |
| JP | 11-279302 A  | 10/1999 |
| JP | 2001-164354 A | 1/2001 |
| JP | 2001-226773 A | 8/2001 |
| JP | 2002-289329 A | 10/2002 |

* cited by examiner

*Primary Examiner*—Ronald W. Leja
(74) *Attorney, Agent, or Firm*—Birch, Stewart, Kolasch & Birhc, LLP

(57) ABSTRACT

An electrostatic chuck is provided in which a lower oxide coating, an electrode, and an upper oxide coating are formed on a substrate. The lower oxide coating is formed by spraying an oxide of Gd, Tb, Dy, Ho, Er, Tm, Yb or Lu and has a dielectric strength of 15-50 kV/mm.

8 Claims, 1 Drawing Sheet

ELECTROSTATIC CHUCK

CROSS-REFERENCE TO RELATED APPLICATION

This application is a continuation-in-part of application Ser. No. 10/737,785 filed on Dec. 18, 2003, now abandoned the entire contents of which are hereby incorporated by reference.

BACKGROUND OF THE INVENTION

1. Field of the Invention

This invention relates to an electrostatic chuck for attracting and holding a workpiece by electrostatic attraction forces and more particularly, to an electrostatic chuck as a support table for holding workpieces such as semiconductor wafers or glass substrates in the processes of manufacturing semiconductor devices and liquid crystal substrates.

2. Background Art

In the conventional semiconductor manufacture process including such steps as etching of a semiconductor wafer, deposition of a thin film on a semiconductor wafer and imagewise exposure of photoresist, an electrostatic chuck is often used for holding the semiconductor wafer.

One typical electrostatic chuck includes an electrode disposed between an insulating substrate and a dielectric layer for electrostatic attraction, the upper surface of the dielectric layer serving as an attracting surface. While a workpiece, typically a semiconductor wafer is rested on the attracting surface, a voltage is applied between the electrode and the semiconductor wafer to develop Coulomb forces or Johnson-Rahbek forces due to inductive polarization, for attracting and holding the wafer. Also known in the art is a dipole type electrostatic chuck comprising a plurality of electrodes formed between an insulating substrate and a dielectric layer for electrostatic attraction wherein a voltage is applied between the electrodes for attracting and holding a wafer resting on the attracting surface.

The dielectric layer used in these electrostatic chucks must meet minimized sliding wear upon mounting and dismounting of wafers, and resistance to corrosion by corrosive gases used in various treatments. The materials employed in the art as satisfying such requirements include insulating ceramics having high wear resistance and corrosion resistance such as alumina and aluminum nitride. However, alumina can be crazed and distorted when sprayed thick, giving rise to delamination and other problems. To enhance the dielectric strength of sprayed alumina coatings, pores in the sprayed coating must be sealed. Through the sealing treatment, organic fills are introduced into pores which in turn, become susceptible to etching, generating unwanted particles. Due to low dielectric strength, ceramics must be deposited to a greater thickness, which leads to a lower attractive force, which in turn, requires to increase a voltage in order to produce a certain attractive force, inviting a vicious circle. The increased thickness also gives rise to the problem that the adhesive strength of sprayed coating is reduced by the stresses associated with thermal expansion.

SUMMARY OF THE INVENTION

An object of the invention is to provide an electrostatic chuck using a high dielectric strength member bearing a sprayed coating which has both halogen plasma resistance and improved dielectric strength properties.

It has been found that a member having a sprayed coating of an oxide of an atomic number 64 to 71 rare earth element formed on a substrate exhibits a high dielectric strength without a need for sealing treatment on the sprayed coating and possesses halogen plasma resistance.

The invention provides an electrostatic chuck comprising a substrate, a lower oxide coating on the substrate, an electrode on the lower oxide coating, and an upper oxide coating on the electrode. The lower oxide coating is formed by spraying an oxide containing a rare earth element having atomic number 64 to 71 and has a dielectric strength of 15 to 50 kV/mm.

According to the present invention, dielectric strength is improved when a dielectric layer for an electrostatic chuck is formed using a heavy rare earth oxide having a high specific gravity preferably by an atmospheric plasma spraying. This allows a certain attractive force to be produced without increasing the coating thickness and restrains a lowering by thermal expansion of the adhesive strength between sprayed coating and substrate. The reduced thickness of coating improves the uniformity of temperature distribution within a wafer attracted thereto, thereby restraining any variation of processing on the wafer surface.

DESCRIPTION OF THE PREFERRED EMBODIMENTS

Figure 1:
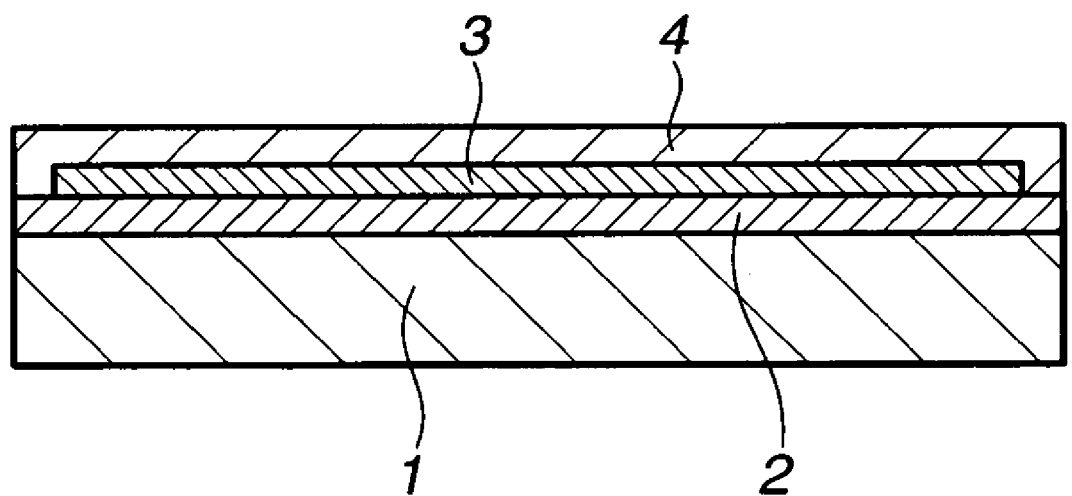
FIG. 1 is a schematic cross-sectional view of an electrostatic chuck in one embodiment of the invention.

Referring to FIG. 1, the electrostatic chuck of the invention uses a high dielectric strength member comprising a substrate 1 and a high dielectric strength coating 2 formed thereon in the form of a sprayed coating of an oxide containing a rare earth element having atomic number 64 to 71. An electrode 3 and a dielectric layer 4 are formed on the member. The high dielectric strength coating 2 and dielectric layer 4 are also referred to as lower and upper oxide coatings, respectively.

The high dielectric strength member of the invention is arrived at by forming on a substrate a sprayed coating of an oxide containing a rare earth element having atomic number 64 to 71. The sprayed coating has a high dielectric strength even without a need for sealing treatment.

The substrate may be selected from among ceramics, metals and composites thereof depending on a particular application, though not critical. Exemplary ceramic materials include shaped bodies composed mainly of quartz, alumina, magnesia and yttria, and complex oxides thereof, shaped bodies composed mainly of silicon nitride, aluminum nitride and boron nitride, and shaped bodies composed mainly of silicon carbide and boron carbide. Exemplary carbon materials include carbon fibers and sintered carbon bodies. Exemplary metal materials include those based on iron, aluminum, magnesium, copper, silicon and nickel, alloys thereof, for example, stainless alloys, aluminum alloys, anodized aluminum alloys, magnesium alloys and copper alloys, and single crystal silicon. Also included in the composite category are metal materials covered with ceramic coatings and aluminum alloys subjected to anodizing treatment or surface treatment, typically plating.

The sprayed coating contains an oxide of a rare earth element having atomic number 64 to 71, i.e., Gd, Tb, Dy, Ho, Er, Tm, Yb and Lu. It is most preferred that the sprayed coating consist solely of the rare earth oxide or oxides although the advantages of the invention are achievable with a sprayed coating containing at least 45% by weight, especially at least 50% by weight of the rare earth oxide. The oxides other than the rare earth oxide in the sprayed coating include $Al_2O_3$, $Y_2O_3$ and oxides of other rare earth elements.

Useful spraying techniques include flame spraying, high velocity oxy-fuel (HVOF) spraying, detonation spraying, plasma spraying, water stabilized plasma spraying, induction (RF) plasma spraying, electromagnetic acceleration plasma spraying, cold spraying, and laser spraying. The spraying technique is not particularly limited although the plasma spraying featuring a high spray output is preferred.

Depending on the operating atmosphere, the spraying is divided into atmospheric spraying and low pressure or vacuum spraying wherein spraying is effected in a chamber kept at a low pressure or vacuum. Since it is advantageous to reduce internal pores in order to form a more densified coating, the low pressure spraying is recommended. However, the low pressure or vacuum spraying technique requires a low pressure or vacuum chamber in order to perform a spraying operation. This imposes spatial or time limits to the spraying operation. Then the present invention favors the atmospheric spraying technique which can be practiced without a need for a special pressure vessel.

The plasma spraying system generally includes a water-cooled plasma gun, a power supply, a powder feeder, and a gas controller. The plasma output is determined by the power supplied to the plasma gun and the feed rates of argon gas, nitrogen gas, hydrogen gas, helium gas or the like. The feed rate of powder is controlled by the powder feeder.

In the plasma spraying technique, a coating is formed by operating a plasma gun to create a plasma, feeding a powder into the plasma for melting particles, and instantaneously impinging molten particles against a substrate. In order to obtain a satisfactory coating, it is requisite that spraying particles be melted fully and moved at a high flight velocity. In order that particles be melted, the residence time of particles within the plasma should be longer, which is equivalent to a lower velocity as long as a limited space is concerned, and is thus contradictory to the high velocity requirement. Increasing the input to the gun leads to increases in both the temperature and flow velocity of a plasma jet. However, the melting of particles is determined by the latent heat of fusion, particle size, specific gravity of material and gas temperature, and the flight velocity is determined by the particle size, specific gravity and jet velocity. It is then believed that the input power must be optimized for each type of powder material.

For the manufacture of a sprayed member having higher dielectric strength, with the above-described spraying conditions taken into account, it is important to use a material having a higher specific gravity as the coating. Namely, by forming a sprayed coating of an oxide having a higher specific gravity than alumina which has traditionally been used in dielectric strength sprayed members, a sprayed member having higher dielectric strength than the alumina-sprayed member is obtainable. In general, compounds of elements of greater atomic numbers often have a higher specific gravity. Of these, rare earth compounds are known to have halogen plasma resistance. However, it is unknown that such rare earth compounds have high dielectric strength. The inventor has discovered that sprayed coatings of oxides of elements having atomic number 64 to 71 have high dielectric strength as well.

Although the thickness of a sprayed coating is not critical, the preferred thickness is from 100 μm to less than 500 μm, more preferably from 100 μm to 450 μm, even more preferably from 100 μm to 400 μm. Too thin a coating may undergo breakdown due to the low dielectric strength at that thickness. Too thick a coating is liable to craze and separate from the substrate.

No particular limits are imposed to the dielectric strength (kV/mm) of the sprayed coating. The preferred dielectric strength is at least 15 kV/mm, more preferably at least 17 kV/mm as the lower limit and up to 50 kV/mm as the upper limit.

Herein, the dielectric strength can be measured according to JIS C2110, for example, using a specimen in which oxide is plasma sprayed on a metal substrate. The sprayed coating on the specimen may have a thickness of about 100 to 500 μm. Specifically, an aluminum substrate of 100 mm×100 mm×5 mm is used, one surface is blasted prior to spraying, and an oxide containing an element having atomic number 64 to 71 is plasma sprayed to form a sprayed coating of about 200 μm thick. The coated substrate is sandwiched between electrodes according to JIS C2110, and voltage is applied thereacross and increased at a rate of 200 V/sec. The voltage at which dielectric breakdown occurs is the breakdown voltage of the coating.

The voltage which is lower by 0.5 kV than the breakdown voltage is a preset voltage. If no dielectric breakdown occurs when the voltage is increased at a rate of 200 V/sec up to the preset voltage and maintained at the preset voltage for 20 seconds, that voltage is the dielectric strength (kV) of the entire sprayed coating. The thus measured dielectric strength (kV) of the entire sprayed coating is normalized as a voltage per the sprayed coating thickness of 1 mm. The normalized value is the dielectric strength (kV/mm).

In order to construct an electrostatic chuck using the high dielectric strength member, an electrode is formed on the surface of the member. Typically used for the electrode are metallic materials and electroconductive ceramic materials, for example, Pd, W, Ag, Mo and Ti. The electrode may be made by forming a film of such material by any of depositing techniques including sputtering, CVD, ion plating, electroplating, spraying, sintering and screen printing. The film may have a thickness of 1 μm to 100 μm, preferably 5 μm to 80 μm. A power supply terminal is connected to the electrode for applying a voltage for producing an electrostatic attraction force.

Further a dielectric material must be deposited on the electrode surface to form an upper coating. Using any of ceramic materials such as alumina, zirconia, yttria and rare earth oxides, an upper coating is formed by any of depositing techniques including sputtering, CVD, spraying, and sintering. In the intended application wherein a substrate which is rested on and attracted by an electrostatic chuck is processed such as by etching, it is preferred to form a coating of the same heavy rare earth oxide as in the dielectric strength member by spraying. The upper coating preferably has a thickness of 10 μm to less than 500 μm, more preferably 100 μm to less than 500 μm.

On use of the thus constructed electrostatic chuck, a substrate, for example, a semiconductor wafer (e.g., silicon wafer) or glass substrate is rested on the chuck. A voltage is applied across the electrode to develop an electrostatic attraction force between the electrode and the substrate whereby the substrate is attracted to the chuck.

EXAMPLE

Examples of the invention are given below by way of illustration and not by way of limitation.

Examples 1-7

Sprayed coatings of 200 μm thick were formed on aluminum substrates of 100 mm×100 mm×5 mm by spraying powders of oxides of atomic number 64 to 71 rare earth elements under spraying conditions: a plasma power of 35 kW, an argon gas flow rate of 40 l/min, a hydrogen gas flow rate of 5 l/min, and a powder feed rate of 20 g/min. Without sealing treatment, the sprayed coatings were subjected to a dielectric strength test.

The dielectric strength test was performed according to JIS C2110. While the voltage was increased at a rate of 200 V/sec, the voltage at which dielectric breakdown occurred was first measured. The voltage which was lower by 0.5 kV than the breakdown voltage was then assumed to be a preset voltage. If no dielectric breakdown occurred when the voltage was increased at a rate of 200 V/sec up to the preset voltage and maintained at the preset voltage for 20 seconds, that voltage was the dielectric strength (kV) of the entire sprayed coating. The thus measured dielectric strength (kV) of the entire sprayed coating was divided by the thickness (200 μm) of the sprayed coating, obtaining a dielectric strength (kV/mm). The results are shown in Table 1.

Comparative Example 1

As in Example 1, $Y_2O_3$ powder having an average particle size of 35 μm was sprayed, and a dielectric strength test performed.

Comparative Example 2

As in Example 1, $Al_2O_3$ powder having an average particle size of 30 μm was sprayed, and a dielectric strength test performed.

The results are shown in Table 1.

TABLE 1

| | Atomic number | Oxide | Specific gravity | Dielectric strength (kV/mm) |
|---|---|---|---|---|
| Example 1 | 64 | $Gd_2O_3$ | 7.62 | 19 |
| Example 2 | 65 | $Tb_2O_3$ | 7.81 | 22 |
| Example 3 | 66 | $Dy_2O_3$ | 7.41 | 26 |
| Example 4 | 67 | $Ho_2O_3$ | 8.36 | 19 |
| Example 5 | 68 | $Er_2O_3$ | 8.65 | 26 |
| Example 6 | 70 | $Yb_2O_3$ | 9.17 | 28 |
| Example 7 | 71 | $Lu_2O_3$ | 9.84 | 25 |
| Comparative Example 1 | 39 | $Y_2O_3$ | 5.03 | 12 |
| Comparative Example 2 | 13 | $Al_2O_3$ | 3.99 | 10 |

Examples 8-14 and Comparative Examples 3-4

Sprayed coatings of 200 μm thick were formed on aluminum substrates of 100 mm×100 mm×5 mm by spraying powders of oxides of atomic number 64 to 71 rare earth elements as shown in Table 2 under atmospheric plasma spraying conditions: a plasma power of 35 kW, an argon gas flow rate of 40 l/min, a hydrogen gas flow rate of 5 l/min, and a substrate-plasma gun distance of 80 mm to 150 mm, while adjusting a powder feed rate to 5 cc/min. Tungsten powder was then sprayed thereon to form an electrode for electrostatic attraction having a diameter of 95 mm and a thickness of 50 μm. An upper oxide coating was further formed on the electrode under the same conditions and to the same thickness (shown in Table 2) as in the previous spraying step. It is noted that the thickness of oxide coating shown in Table 2 is determined from the results in Table 1 as the thickness at which no dielectric breakdown occurs upon application of 3 kV.

The electrostatic chucks thus constructed were tested at room temperature (25° C.). A silicon wafer having a diameter of 4 inches was rested on the attracting surface. By applying a voltage of 300 V between the electrode and the wafer, the wafer was attracted to and held by the attracting surface. The force needed to detach the wafer from the chuck in this state was measured as an attractive force, with the results shown in Table 2.

In another experiment, each oxide was deposited on an aluminum disk having a diameter of 25 mm and a thickness of 5 mm under the above-described spraying conditions and to the thickness shown in Table 2. Thermal cycles of heating at 150° C. for 2 hours were repeated 20 times, following which bond strength was measured. Specifically, the coated disk was joined to an aluminum rod having a diameter of 25 mm and a length of 100 mm with an epoxy adhesive. Bond strength was measured using a tensile tester. The results are shown in Table 2.

TABLE 2

| | Atomic number | Oxide | Specific gravity | Substrate-plasma gun distance (mm) | Coating thickness (μm) | Attractive force (kPa) | Bond strength (MPa) |
|---|---|---|---|---|---|---|---|
| Example 8 | 64 | $Gd_2O_3$ | 7.62 | 80 | 200 | 2 | 32 |
| Example 9 | 65 | $Tb_2O_3$ | 7.81 | 90 | 180 | 3 | 28 |
| Example 10 | 66 | $Dy_2O_3$ | 7.41 | 100 | 150 | 4 | 28 |
| Example 11 | 67 | $Ho_2O_3$ | 8.36 | 110 | 200 | 2 | 25 |
| Example 12 | 68 | $Er_2O_3$ | 8.65 | 120 | 150 | 4 | 22 |
| Example 13 | 70 | $Yb_2O_3$ | 9.17 | 130 | 130 | 5 | 20 |
| Example 14 | 71 | $Lu_2O_3$ | 9.84 | 150 | 150 | 4 | 15 |
| Comparative Example 3 | 39 | $Y_2O_3$ | 5.03 | 120 | 300 | 1 | 9 |

TABLE 2-continued

|  | Atomic number | Oxide | Specific gravity | Substrate-plasma gun distance (mm) | Coating thickness (μm) | Attractive force (kPa) | Bond strength (MPa) |
|---|---|---|---|---|---|---|---|
| Comparative Example 4 | 13 | Al$_2$O$_3$ | 3.99 | 100 | 350 | 0.5 | 10 |

Japanese Patent Application No. 2002-379389 is incorporated herein by reference.

Reasonable modifications and variations are possible from the foregoing disclosure without departing from either the spirit or scope of the present invention as defined by the claims.

The invention claimed is:

1. An electrostatic chuck comprising:
a substrate;
a lower oxide coating on the substrate;
an electrode on the lower oxide coating; and
an upper oxide coating on the electrode, wherein
said lower oxide coating is formed by spraying an oxide containing at least 50% by weight of a rare earth element having atomic number 64 to 71 and has a dielectric strength of 15 to 50 kV/mm, and
said upper oxide coating is formed by spraying an oxide containing at least 50% by weight of a rare earth element having atomic number 64 to 71.

2. The electrostatic chuck of claim 1, wherein the oxide coatings each have a thickness of 100 μm to less than 500 μm.

3. The electrostatic chuck of claim 1, wherein said lower oxide coating is formed by an atmospheric plasma spraying.

4. The electrostatic chuck of claim 1, wherein said upper oxide coating is formed by an atmospheric plasma spraying.

5. An electrostatic chuck comprising:
a substrate;
a lower oxide coating on the substrate;
an electrode on the lower oxide coating; and
an upper oxide coating on the electrode, wherein
said lower oxide coating comprises at least 50% by weight of an oxide or oxides containing at least one rare earth element selected from the group consisting of Gd, Tb, Dy, Ho, Er, Tm, Yb, and Lu, and has a dielectric strength of 15 to 50 kV/mm, and
said upper oxide coating comprises at least 50% by weight of an oxide or oxides containing at least one rare earth element selected from the group consisting of Gd, Tb, Dy, Ho, Er, Tm, Yb and Lu.

6. The electrostatic chuck of claim 5, wherein
said lower oxide coating consists solely of said oxide or oxides.

7. The electrostatic chuck of claim 5, wherein the oxide coatings each have a thickness of 100 μm to less than 400 μm.

8. The electrostatic chuck of claim 5, wherein
said lower oxide coating has a dielectric strength of 17 to 50 kV/mm.

* * * * *